United States Patent
Francis

(10) Patent No.: US 10,311,116 B2
(45) Date of Patent: Jun. 4, 2019

(54) MULTI-FUNCTION SEARCH BUTTON

(71) Applicant: Samsung Electronics Co., Ltd., Suwon-si, Gyeonggi-do (KR)

(72) Inventor: Thomas Lee Francis, Dubuque, IA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 15/163,355

(22) Filed: May 24, 2016

(65) Prior Publication Data

US 2017/0116340 A1    Apr. 27, 2017

Related U.S. Application Data

(60) Provisional application No. 62/244,312, filed on Oct. 21, 2015.

(51) Int. Cl.
   *G06F 17/30* (2006.01)
   *G06F 16/9535* (2019.01)
   *G06F 3/0488* (2013.01)

(52) U.S. Cl.
   CPC ........ *G06F 16/9535* (2019.01); *G06F 3/0488* (2013.01); *G06F 17/30867* (2013.01)

(58) Field of Classification Search
   CPC ............... G06F 3/0481; G06F 3/04817; G06F 3/04842; G06F 3/0488; G06F 3/04886; G06F 3/04883; G06F 17/30867
   USPC ........................................................ 715/780
   See application file for complete search history.

(56) References Cited

U.S. PATENT DOCUMENTS

| | | | | |
|---|---|---|---|---|
| 6,523,037 B1* | 2/2003 | Monahan | .......... | G06F 17/30575 |
| 7,089,237 B2* | 8/2006 | Turnbull | .......... | G06F 17/30867 |
| 7,644,373 B2* | 1/2010 | Jing | ................ | G06F 17/30265 |
| | | | | 715/838 |
| 8,055,673 B2* | 11/2011 | Churchill | .......... | G06F 17/30867 |
| | | | | 706/45 |
| 8,229,911 B2* | 7/2012 | Bennett | ............. | G06F 17/30867 |
| | | | | 707/706 |
| 8,229,959 B1* | 7/2012 | Yagnik | ............. | G06F 17/30991 |
| | | | | 707/782 |
| 8,719,256 B2* | 5/2014 | Jones | ................ | G06F 17/30637 |
| | | | | 707/718 |

(Continued)

*Primary Examiner* — Scott T Baderman
*Assistant Examiner* — Hassan Mrabi
(74) *Attorney, Agent, or Firm* — Jefferson IP Law, LLP

(57) ABSTRACT

A method for executing searches using a multi-function search button is disclosed. In some implementations the method includes receiving a search query in a search box via a user interface and receiving a first selection of the search button via the user interface. The method includes generating a first query wrapper containing the search query and first search indicia indicating a first search function, and transmitting the first query wrapper to a search system. The method further includes receiving and displaying first search results. The method further includes receiving a second selection of the search button and generating a second query wrapper in response to the second selection. The second query wrapper contains the search query and second search indicia indicating a second search function. The method includes transmitting the second query wrapper to the search system, receiving second search results, and displaying the second search results.

14 Claims, 9 Drawing Sheets

(56) References Cited

U.S. PATENT DOCUMENTS

| | | | | |
|---|---|---|---|---|
| 8,788,476 B2* | 7/2014 | Jones | G06F 17/30867 |
| | | | 707/706 |
| 8,839,140 B2* | 9/2014 | Nassar | G06F 17/30241 |
| | | | 715/780 |
| 8,849,810 B2* | 9/2014 | Lucovsky | G06F 17/30864 |
| | | | 707/728 |
| 8,898,132 B2* | 11/2014 | Gabriel | G06F 17/30864 |
| | | | 707/706 |
| 8,959,082 B2* | 2/2015 | Davis | G06F 17/30047 |
| | | | 707/723 |
| 9,077,929 B2* | 7/2015 | Shan | H04N 5/4403 |
| 9,141,701 B2* | 9/2015 | Lazaridis | G06F 3/14 |
| 9,595,048 B2* | 3/2017 | Wu | G06Q 30/0256 |
| 9,703,882 B2* | 7/2017 | Shapira | G06F 17/30864 |
| 9,734,251 B2* | 8/2017 | Kasperski | G06F 17/3087 |
| 9,785,714 B2* | 10/2017 | Gabriel | G06F 17/30864 |
| 2006/0259494 A1* | 11/2006 | Watson | G06F 17/30864 |
| 2006/0294189 A1* | 12/2006 | Natarajan | G06F 17/30864 |
| | | | 709/206 |
| 2007/0203906 A1* | 8/2007 | Cone | G06F 17/30867 |
| 2008/0005118 A1* | 1/2008 | Shakib | G06F 17/30864 |
| 2010/0161429 A1* | 6/2010 | Mandel | G06Q 30/02 |
| | | | 705/14.73 |

* cited by examiner

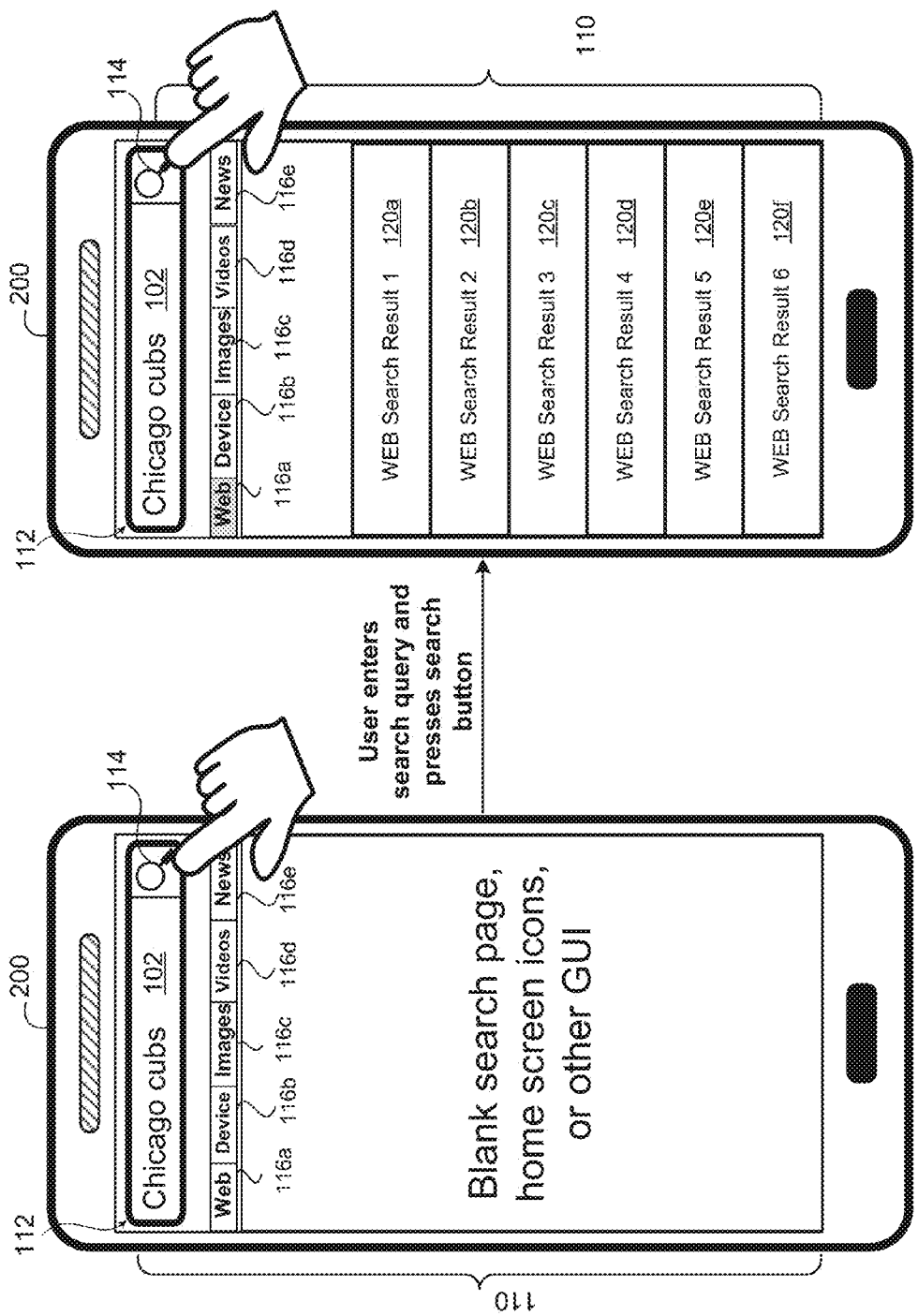

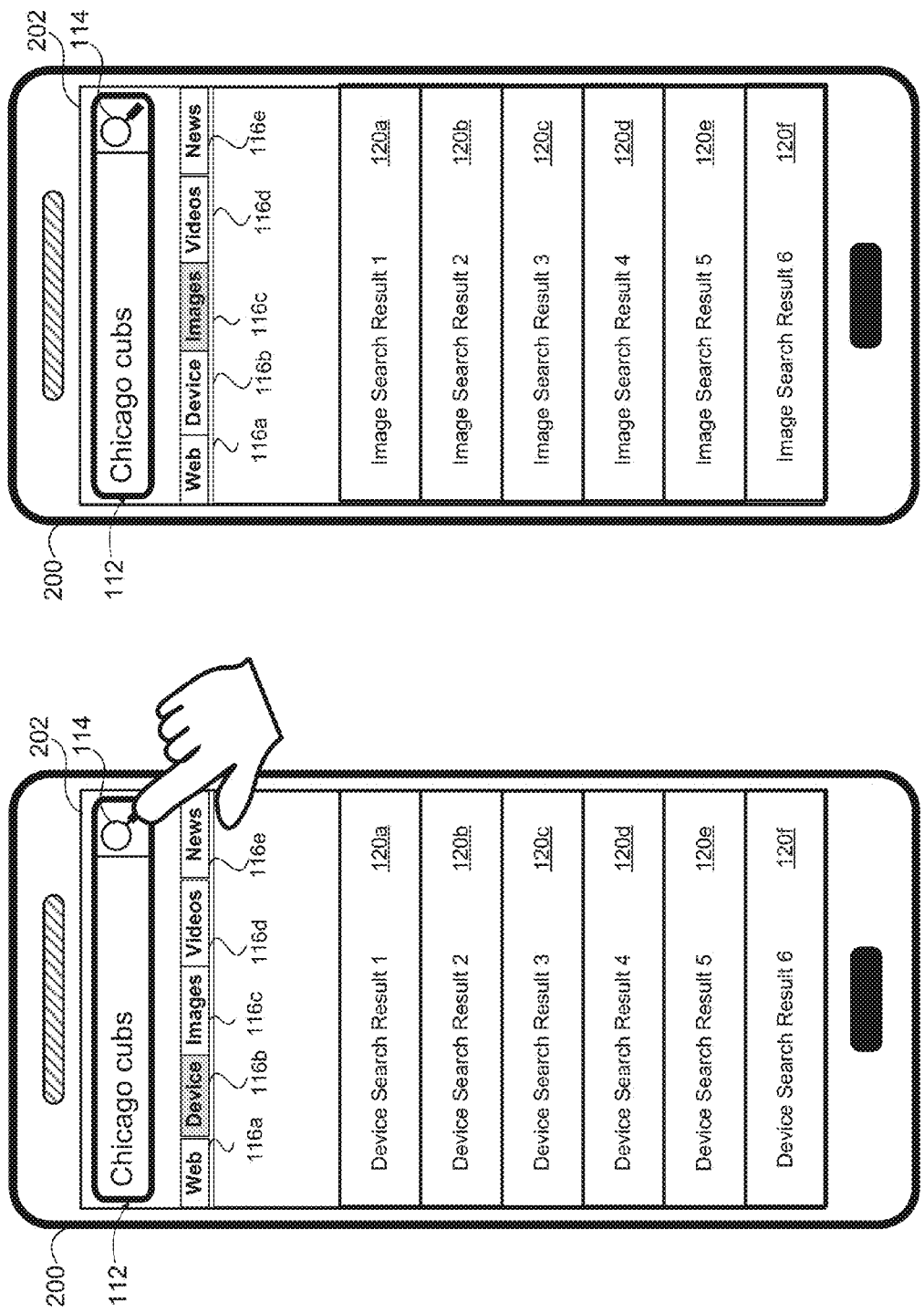

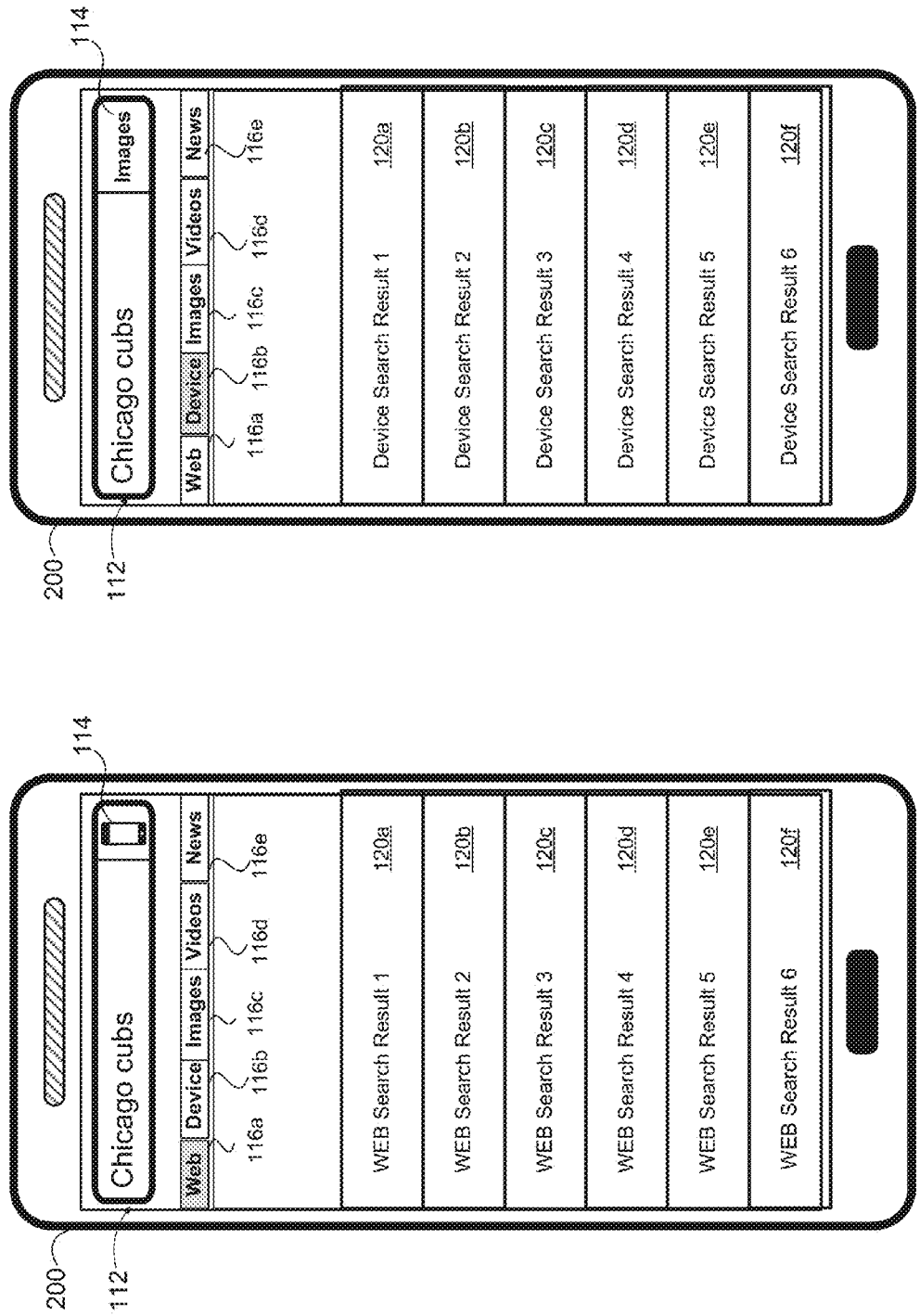

ns has grown exponentially. Corresearching.

MULTI-FUNCTION SEARCH BUTTON

CROSS-REFERENCE TO RELATED APPLICATIONS

This application claims priority under 35 U.S.C. § 119(e) to U.S. Provisional Application 62/244,312, filed on Oct. 21, 2015, which is hereby incorporated by reference in its entirety.

TECHNICAL FIELD

This disclosure relates to a multi-function search button.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions. In addition, information available on the internet has grown exponentially, which may make it difficult for a user to find specific information he/she is researching.

SUMMARY

In some implementations, the present disclosure is directed to a method for executing a search on a user device using a multi-function search button. The method may be implemented as computer-executable instructions that are executed by a processing device of a user device. The method may include presenting a graphical user interface including a search box and a search button. The search box receives user input indicative of a search query and the search button receives user input indicating a command to execute a search. The method further includes receiving the search query in the search box via a user interface of the user device. The method further includes receiving a first selection of the search button via the user interface. The method further includes in response to the first selection, generating a first query wrapper containing the search query and first search indicia and transmitting the first query wrapper to a search system. The first search indicia is indicative of a first search function. The method further includes receiving first search results from the search system in response to the first query wrapper and displaying the first search results in the graphical user interface. The method further includes receiving a second selection of the search button and, in response to the second selection, generating a second query wrapper containing the search query and second search indicia. The second search indicia is indicative of a second search function. The method further includes transmitting the second query wrapper to the search system, receiving second search results from the search system in response to the second query wrapper, and displaying the second search results in the graphical user interface in place of the first search results.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1B-1E are schematics illustrating an example of different types of searches being executed using a multi-function search button.

FIGS. 1F-1G are schematics illustrating an example of a user device displaying different images in the multi-function search button to indicate the next search function.

Like reference symbols in the various drawings indicate like elements.

DETAILED DESCRIPTION

Figure 1A:
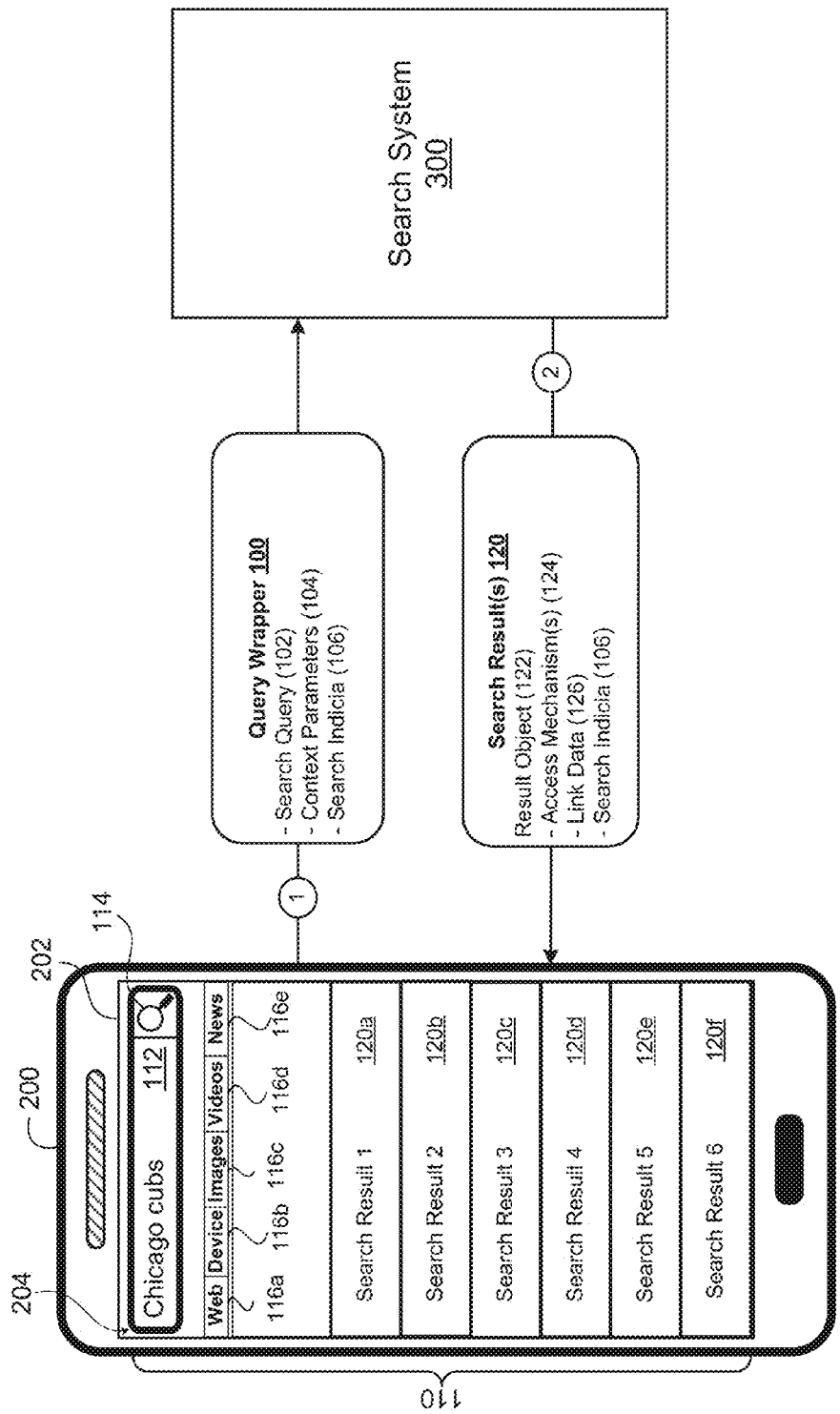
FIG. 1A is a schematic view of an environment that includes a search system and a user device that provides a multi-function search button.

The present disclosure relates to a user device configured with a multi-function search button. A multi-function search button may be a user interface element that when selected requests search results from a search system. In response to receiving a search query and a selection of the multi-function search button, the user device generates a query wrapper containing the search query and a search indicia that is indicative of a search function. A search function can relate to a constraint or category that is associated with the search. For instance, the search function may limit the search to searches for web application search results only (e.g., only to websites), searches of applications installed on the user device, searches for videos, searches for news, or searches for particular categories, for example. Furthermore, the multi-function search button may be implemented in the search functionality of special purpose applications. For example, the search functions implemented by a restaurant review application may limit searches to particular cuisines or particular cities. Similarly, the search functions implemented in a retail application may limit searches to particular categories of goods or products.

A user can control which search indicia is provided in the query wrapper by sequentially pressing the multi-function search button without changing the search query. Each time the user selects the multi-function search button (e.g., presses on the button), the search application iterates to a next search indicia. In some implementations, a search indicia may be an identifier of the search function. For example, the indicia may be a word describing the search function or an alpha numeric code that is associated with the search function. In other implementations, the search indicia is a value indicating (e.g., equal to) the number of times the search button has been pressed by the user without the user changing the search query. Each time the user selects (e.g., presses) the search button without changing the search query, the search application may increase the value to indicate the number of consecutive selections. The search system can then use this value to determine the search function.

The search system receives the query wrapper and determines a set of search results based on the search query and the search function indicated by the indicia. The search system returns the search results to the user device. The user device displays the search results in a graphical user interface, such as a search engine results page (SERP). The user can select the multi-function search button again to change the indicia. In response, the search application iterates to the next indicia (e.g., second search indicia) in a new query wrapper and transmits the new query wrapper to the search system. The search system returns new search results that correspond to the next indicia, which the user device in turn displays in a graphical user interface (e.g., in the SERP). The user can continue in this manner to see search results pertaining to different functions of the search system. For example, the user may iterate through web results, device search results, image search results, and then news search results by pressing the same search button four times. The multi-function search button allows device manufacturers to manufacture user devices with smaller screens (e.g., smaller smartphones or watches). Additionally, graphical user interfaces of applications do not have to allocate additional screen space to different search functions, which allows application developers to allocate more screen space to other content.

FIG. 1A illustrates an example user device 200 communicating with a search system 300. The user device 200 transmits a query wrapper 100 to the search system 300 via a network (not shown). The query wrapper 100 contains a search query 102, one or more context parameters 104, and a search indicia 106. The search query 102 is a string of one or more characters. A user provides the search query to the user device 200 via a user interface of the user device 200. The context parameters 104 can include any values that provide context to the search query 102. Examples of context parameters 104 include a location of the user device 200, a user profile for the user of the user device 200, a language of the user device 200, an operating system of the user device 200, or the like. The search indicia 106 is indicative of a search function. A search function can relate to a constraint or category that is associated with the search. For example, the search function may define the type of search to perform, the type of search results to provide, or a category relating to the search.

In the illustrated example, the user device 200 is displaying a search graphical user interface (GUI) 110. The search GUI 110 includes a search bar 112 and a multi-function search button 114. The search bar 112 receives a search query 102 from the user. The user can select (e.g., press on) the multi-function search button 114 to execute the search. In response to the selection of the multi-function search button 114, the user device 200 generates a query wrapper 100 based on the search query 102 and the state of the multi-function search button 114. The state of the multi-function search button 114 is dependent on the number of times the multi-function search button 114 was selected by the user without altering the search query 102. Each time the user selects the search button 114, the user device 200 may alter the search indicia 104 in the query wrapper 100.

In response to the query wrapper 100, the search system 300 identifies and returns search results 120. The search results 120 contain one or more result objects 122. Each result object contains one or more access mechanisms 124 and link data 126. An access mechanism is a string of characters (e.g., letters, numbers, and/or symbols) that is used to access a specific state of a software application. Examples of access mechanisms include web access mechanisms (e.g., Uniform Resource Locators) and application access mechanisms (e.g., Application Resource Identifiers). The former are used to access a state of a software application via a web application edition of the software application, while the latter are used to access a state of a software application via a native application edition of the software application. The link data 126 includes any data and/or instructions that are used to render the individual search results (e.g., 120a) in the search GUI 110. For example, the link data 126 may include an image, an icon, and/or text that is displayed in individual search results.

In the illustrated example, the search GUI 110 displays different tabs 116 corresponding to different search functions (e.g., web 116a, device 116b, images 116c, videos 116d, and news 116e). The user can use the multi-function search button 114 to view search results 120 pertaining to different search functions. In this way, the user does not need to press the tabs 116, but can rather press the multi-function search button 114 repeatedly to access different search functions.

FIGS. 1B-1E illustrate an example implementation of the multi-function search button 114. In FIG. 1B, the user has entered the search query 102 "Chicago cubs" but has not yet executed the search. Accordingly, there are not yet search results displayed in the GUI 110 corresponding to the search query 102. In FIG. 1C, the user has selected the multi-function search button 114. In this example, this is the first instance where the user has selected the multi-function search button 114. In response to the selection of the multi-function search button 114, the user device 200 transmits a query wrapper 100 containing the search query 102 "Chicago cubs" and a first search indicia, where the first search indicia is indicative of a "web search results" constraint. The first search indicia may be a code indicating the "web search results" or may be the number of consecutive selections without changing the search query 102 (i.e., one consecutive selection). Thus, in the search results 120 depicted in FIG. 1C, all of the search results are web search results.

In FIG. 1D, the user has selected the multi-function search button 114 a second time without changing the "Chicago cubs" search query 102. Thus, after the second press the user device transmits a query wrapper 100 containing the search query 102 "Chicago cubs" and a second search indicia, where the second search indicia is indicative of "device search results." The second search indicia may be a code indicating "device search results" or may be the number of consecutive selections without changing the search query 102 (i.e., two consecutive selections). Thus, in FIG. 1D, the search results 120 are device specific search results (e.g., links to items stored on the device or accessible by a native application installed on the device). In some implementations, the search application may search the device for items stored on the device instead of transmitting the search query to the search system.

In FIG. 1E, the user has selected the multi-function search button 114 for a third time without changing the "Chicago cubs" search query 102. Thus, after the third selection, the user device transmits a query wrapper 100 containing the search query 102 "Chicago cubs" and a third search indicia, where the third search indicia is indicative of "image results only." The third search indicia may be a code indicating "image results only" or may be the number of consecutive selections without changing the search query 102 (i.e., three consecutive selections). Thus, in FIG. 1E, the search results 120 are links to images corresponding to the search query 102. The user may continue in this manner to view video search results, news search results, or any other search results.

FIGS. 1F and 1G illustrate an example implementation of the present disclosure. In the illustrated example, the user device 200 alters the image depicted it the multi-function search button 114 to indicate the function attributed to the multi-function search button. In FIG. 1F, the user has entered the search query 102 "Chicago cubs" and has selected the multi-function search button 114. Thus, in FIG. 1F, the user device 200 is displaying web search results 120. In this example, the multi-function search button 114 depicts a user device, thereby indicating that the next function is "device search results." In FIG. 1G, the user has selected the multi-function search button from FIG. 1F. Thus, in FIG. 1G, the user device 200 depicts device search results. The next search function in the series of search functions is an image search. Thus, the multi-function search button 114 depicts the term "images" in FIG. 1G.

Figure 1I:
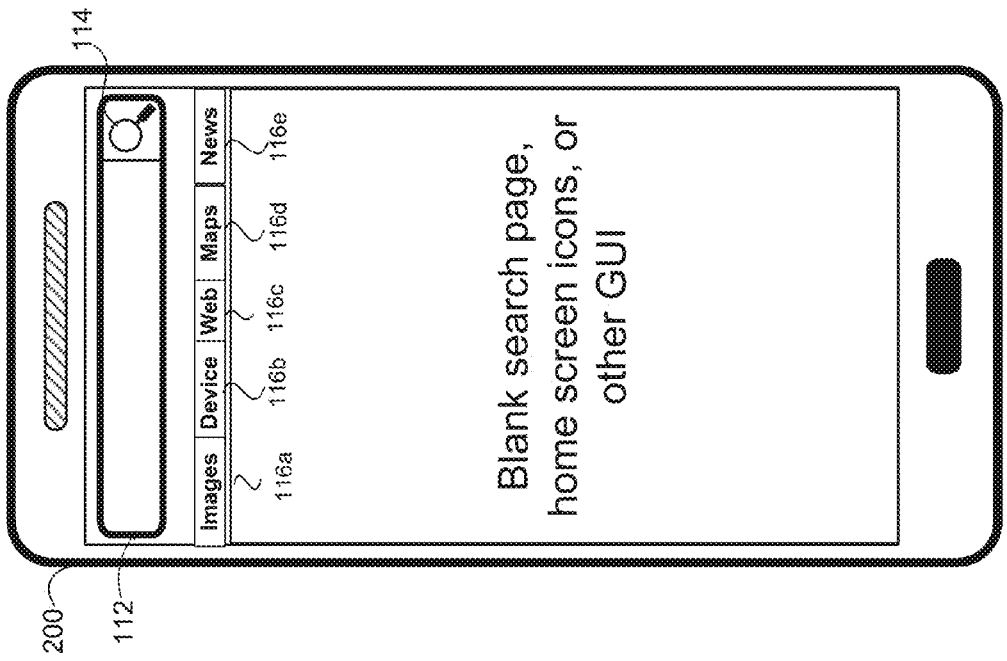
FIGS. 1H-1I are schematics illustrating an example of a graphical user interface element that allows a user to customize the order of search functions utilized by the multi-function search button.
Figure 1H:
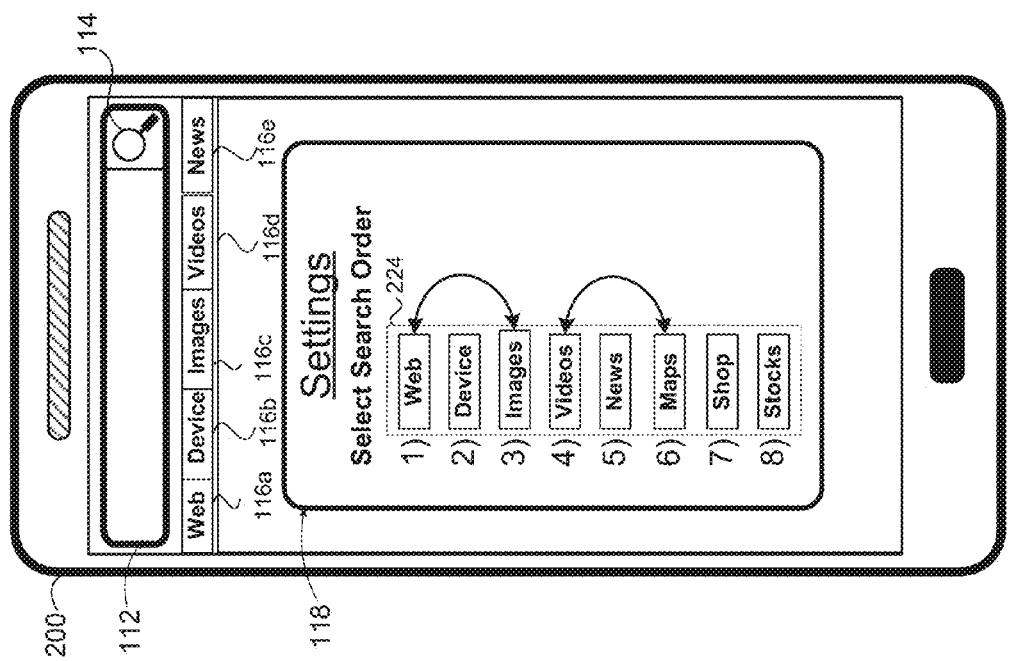

In the examples of FIGS. 1B-1G, the sequence of functions of the multi-function search button 114 is a default sequence (e.g., web, device, images, videos, news). In some implementations, however, the user can select the sequence of functions of the multi-function search button 114. FIG. 1H illustrates an example menu 118 that allows a user to change the sequence of functions. In the example of FIG. 1H, the user has altered the sequence of functions so that the sequence of functions is as follows: images, device, web, maps, news, videos, shop, and stocks. In FIG. 1I, the search GUI 110 reflects the user-specified sequence of functions.

Figure 1J:
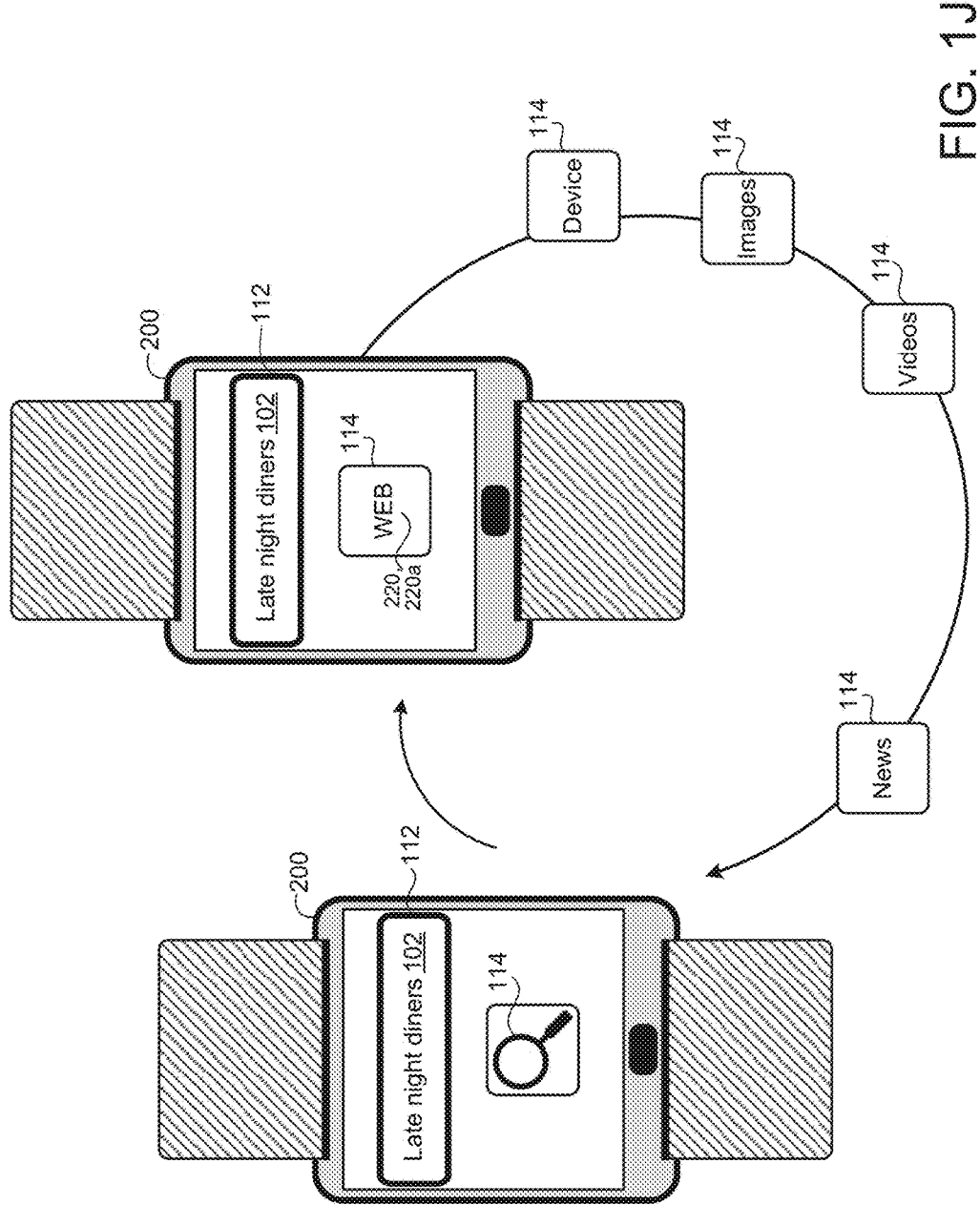
FIG. 1J is a schematic illustrating an example of the multi-function search button implemented on a smart watch user device.

While FIGS. 1A-1I illustrate the user device 200 as a mobile device, the user device 200 may be any suitable consumer device. In some scenarios, the multi-function search button 114 offers even more advantage on user devices 200 with relatively small screens (e.g., wearable devices, such as watches). In FIG. 1J, the user device 200 is a smart watch. As shown in FIG. 1J, the user device 200 includes a search bar 112 and a multi-function search button 114. The user can enter the search query 102 using a voice command. The user can then select the multi-function search button 114 to iterate through the different search functions.

Figure 2:
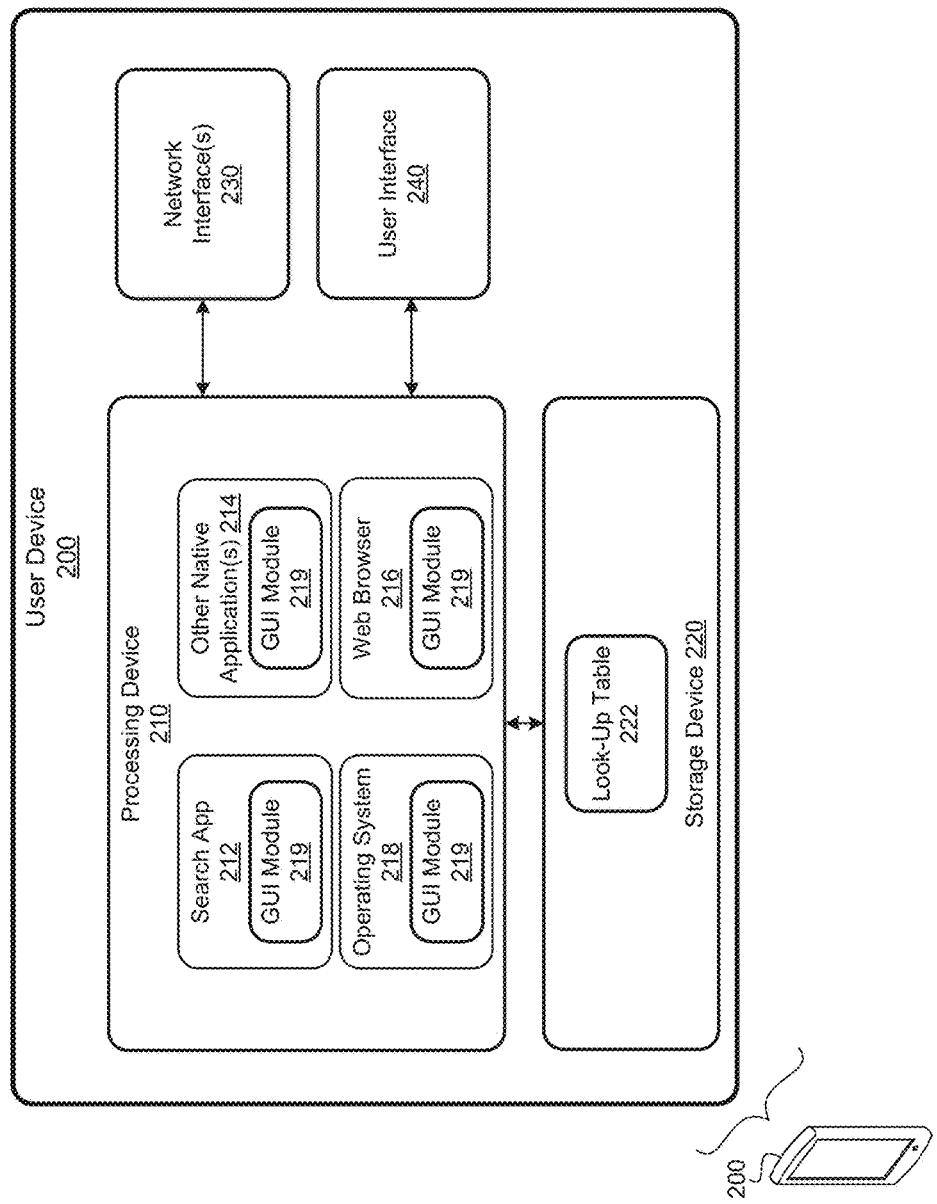
FIG. 2 is a schematic illustrating an example user device and the components thereof.

FIG. 2 illustrates a user device 200 according to some implementations of the present disclosure. In the illustrated example, the user device 200 includes a processing device 210, a storage device 220 (e.g., memory device), a user interface 240, and a network interface device 230. The user device 200 may include additional components not depicted in FIG. 2.

The processing device 210 can include one or more processors that execute computer-executable instructions and associated memory (e.g., RAM and/or ROM) that stores the computer-executable instructions. In implementations where the processing device 210 includes more than one processor, the processors can execute in a distributed or individual manner. The processing device 210 can execute an operating system 218, a search application 212 (which may be a native application), one or more native applications 214, and a web browser 216, all of which can be implemented as computer-readable instructions. The operating system 218, the search application 212 (which may be a native application), the one or more native applications 214, and/or the web browser 216 may include a search GUI module 219, which is described in greater detail below.

The storage device 220 can include one or more computer-readable mediums (e.g., hard disk drives, solid state memory drives, and/or flash memory drives). The storage device 220 can store any suitable data that is utilized by the operating system of the user device 200. The network interface 230 includes one or more devices that are configured to communicate with the network. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

The search GUI module 219 (GUI module 219) displays a search bar 112 and a multi-function search button 114. As can be appreciated, the search bar 112 may be displayed in any suitable application that supports any type of searching. Thus, the search bar 112 may be displayed in a launcher/home screen of a user device 200, a stand-alone search application, a web browser, or in any native application. In response to receiving a search query 102 in the search bar 112, the GUI module 219 can display the search query 102 in the search bar 112.

When the user selects the multi-function search button 114, the GUI module 219 generates a query wrapper 100. The GUI module 219 can insert the search query 102 into the query wrapper 100. The GUI module 219 can also obtain one or more context parameters 104 to include in the query wrapper 100. For instance, the GUI module 219 may obtain a geolocation from a global positioning system (GPS) receiver of the user device 200. Similarly, the GUI module 219 may obtain a username or user profile ID of the user to include in the query wrapper 100.

The GUI module 219 also includes a search indicia 106 in the query wrapper 100. The GUI module 219 determines the search indicia 106 based on a number of consecutive selections of the multi-function search button 114 without altering the search query 102. Thus, the GUI module 219 tracks the number of times the user has selected the search button 114 without altering the search query 102. In some implementations, the GUI module 219 maintains a search counter that is incremented each time the user selects the multi-function search button 114 and is reset each time the user alters the search query 102. In some implementations, the GUI module 219 inserts the number of consecutive selections in the query wrapper 100. In these implementations, the search system 300 is tasked with determining the search indicia 106 based on the search counter (i.e., the number of consecutive selections).

In some implementations, the search indicia 106 may be an identifier of a search function. The identifier may be a name of the function or a code (e.g., an alphanumeric string) that identifies the search function. In these implementations, the GUI module 219 can look up the identifier in, for example, a look-up table 222 that associates numbers of consecutive selections to different search function identifiers. The look-up table 222 is queried with a number and outputs a search function identifier. Thus, the GUI module 219 queries the look-up table 222 with the number of consecutive selections of the multi-function search button 114 and receives a search function identifier. The GUI module 219 inserts the search function identifier in the query wrapper 102.

In response to a user entering or altering a search query, the GUI module 219 resets the counter of consecutive selections. In response to the user selecting the multi-function search button 114, the GUI module 219 increments the counter and generates the query wrapper 100. The GUI module 219 transmits the query wrapper 100 to the search system 300. In response to the query wrapper 100, the search system 300 transmits search results 120 corresponding to the search indicia 106 to the user device 200. The GUI module 219 receives the search results 120 and displays the search results 120 in the search GUI 219. If the user selects the multi-function search button 114, the search GUI 219 increments the search counter and generates a new query wrapper 100 based on the search query 102 and context parameters 104 in the previous query wrapper 100, as well as a search indicia based on the incremented counter value. In this way, the user can iterate through different search results 120 corresponding to different search functions based on the same search query 102. In some implementations, the search GUI 219 can alter an image depicted on the multi-function search button 114 each time the user selects the multi-function search button 114. The image that is depicted in the multi-function search button can be indicative of the search function the next time the user selects the multi-function search button 114.

As mentioned, in some implementations the GUI module 219 may utilize a look-up table 222 to determine the search indicia. In some of these implementations, the user can adjust the associations in the look-up table 222 so that the order by which the different search functions are preformed can be customized. In these implementations, the GUI module 219 may include a GUI screen that allows the user to define the sequence of search functions. Initially the look-up table is ordered in a default sequence. The user may, however, access the GUI screen that allows the user to define the sequence of search functions (e.g., FIG. 1H). The user defines the sequence of search functions. In response to the user definition, the search GUI 219 can alter the associations in the look-up table in accordance with the user defined sequence.

Figure 3:
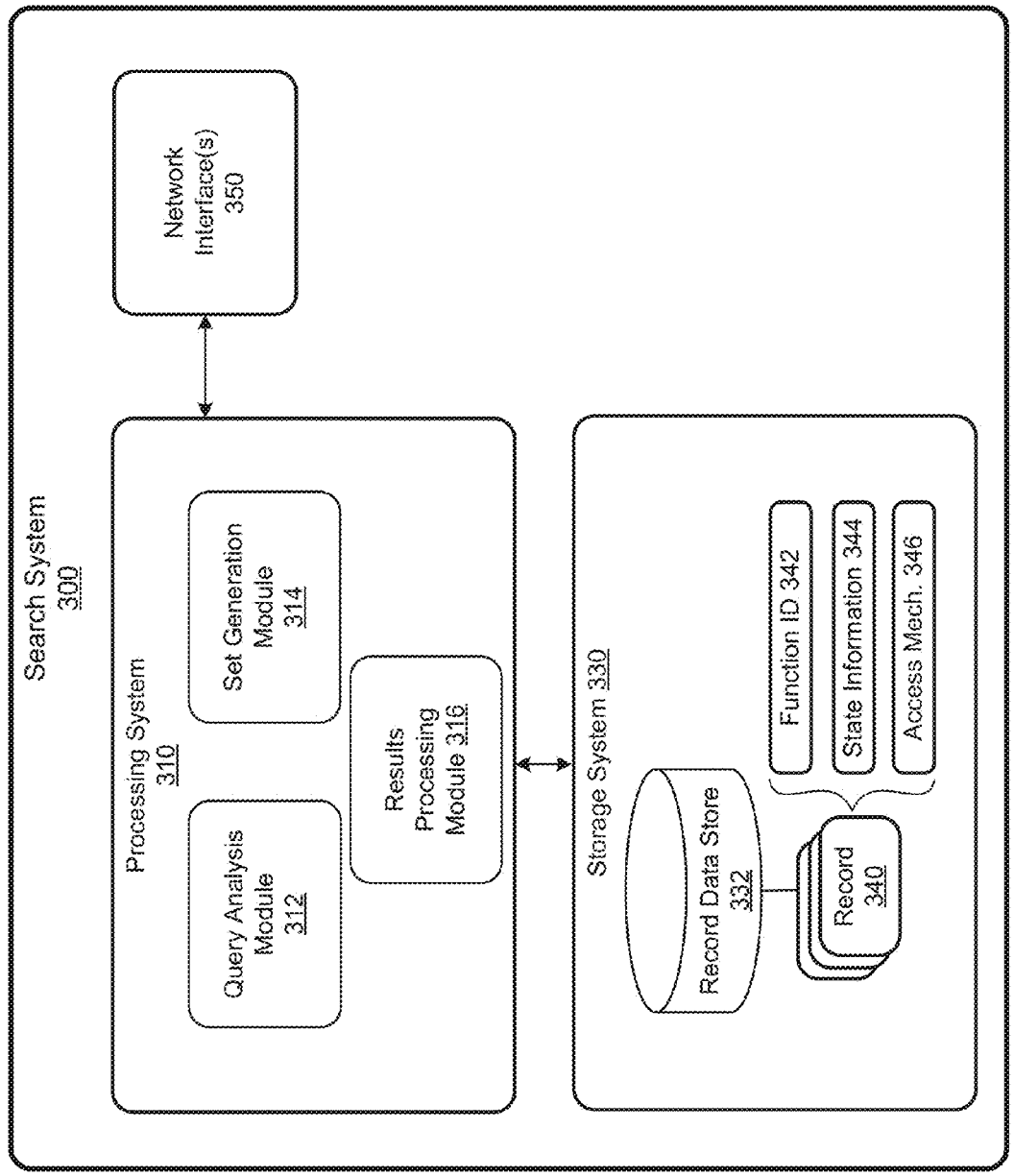
FIG. 3 is a schematic illustrating an example search system and the components thereof.

FIG. 3 illustrates an example search system 300. In general, the search system 300 receives a query wrapper 100 and returns a set of search results 120 that are determined based on the search query 102, the search indicia 106, and in some implementations, the context parameters 104. For example, the search system 300 may identify the search results 120 based on the search query 102 and context parameters 104, but may filter the search results 120 according to the search indicia. The example of FIG. 3 provides example implementations of the search system 300. Additional and/or alternative search techniques may be implemented at the search system 300 without departing from the scope of the disclosure.

The example search system 300 of FIG. 3 may include a processing system 310, a storage system 330, and a network interface 350. The search system 300 may include additional components not explicitly discussed herein. The components may be interconnected, for example, by a bus and/or any other form or medium of digital data communication, e.g., a communication network.

The processing system 310 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. In the illustrated example, the processing system 310 executes a query analysis module 312, a set generation module 314, and a results processing module 316.

The network interface 350 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 330 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 330 stores a record data store 332. The record data store 332 stores a plurality of records 340. The records 340 can include any suitable data that relates to an underlying document (e.g., a crawled state of a software application). For purposes of explanation, the records 340 are assumed to describe states of software applications. The exact contents of the records 340, however, may vary without departing from the scope of this disclosure. In some examples, a record 340 may include a function identifier 342 (function ID 342), application state information 344, and one or more access mechanisms 346. The function ID 342 may be used to identify the record 340 among the other records 340 included in the record data store 332. The function ID 342 can also be used to access a state of an application. Put another way, the function ID 342 can be used to generate or lookup one or more access mechanisms that access a state of a software application, whereby the record 340 in which function ID 342 is stored defines features of the state of the software application. A function ID 342 may be a string alphabetic, numeric, and/or symbolic characters (e.g., punctuation marks), a human-readable string that describes the state of the application, or a string having a structure of a resource identifier. In the latter implementations, a function ID 342 may utilize any suitable namespace (e.g., http://exampleapp.com/param1¶m2 or func://exampleapp.com/param1¶m2).

The application state information 344 (or state information 344) includes any information relating to the linked to state. The application state information 344 may include data that describes an application state. Additionally, or alternatively, the application state information 344 may include data that describes the function performed according to the access mechanism(s) included in the record 340. The application state information 344 may include a variety of different types of data. For example, the application state information 344 may include structured, semi-structured, and/or unstructured data. The search system 300 may collect, extract, and/or infer the application state information 344 from documents retrieved from remote data sources, such as digital distribution platforms, application descriptions, blogs, application reviews, or other sources that can be accessed via the network. Additionally, or alternatively, the application state information 344 may be manually generated data. The search system 300 may update the application state information 344 in any record 340 so that up-to-date search results 120 can be provided in response to a search query 102.

In some examples, the application state information 344 may include data that may be presented to the user by a software application when an instance of an edition of the software application is set in the application state defined by the access mechanism 346. For example, if one of the access mechanism(s) 346 is an application access mechanism, the application state information 344 may include data that describes a state of the native application after the user device 200 has performed the one or more operations indicated in the application access mechanism. In one example, if the record 340 is associated with a shopping application, the application state information 344 may include data that describes products (e.g., names and prices) that are shown when the shopping application is set to the application state defined by the access mechanism data 364. As another example, if the record 340 is associated with a music player application, the application state information 344 may include data that describes a song (e.g., name and artist) that is played when the music player application is set to the application state defined by the access mechanism 346.

The types of data included in the application state information 344 may depend on the type of information associated with the application state and the functionality defined by the access mechanism(s) 346. In one example, if the record 340 is for an application that provides reviews of restaurants, the application state information 344 may include information (e.g., text and numbers) related to a restaurant, such as a category of the restaurant, reviews of the restaurant, and a menu for the restaurant. In this example, the access mechanism data 346 may cause the application (e.g., a web or native application) to launch and retrieve information for the restaurant (e.g., using a web browser application or one of the native applications installed on the user device 200). As another example, if the record 340 is for a media-related software application that plays music, the application state information 344 may include information related to a song, such as the name of the song, the artist, lyrics, and listener reviews. In this example, the access mechanism(s) may cause a user device to launch an edition of the software application and play the song described in the application state information 344.

The application state information 344 may further define keywords relating to the document described by the record 340. For instance, the application state information 344 may include any text found in the document (e.g., the text appearing in a web page or at a state of a native application). The application state information 344 may further include entity information, such as entity types that correspond to the state of the application defined by the record 340.

In some implementations, the application state information 344 may include one or more tags. The tags respectively indicate a function or category associated with the record 340. For instance, a tag may indicate that the record 340 defines a state of an application that can be accessed by a web application edition. Similarly, another tag may indicate that the record 340 defines a state of an application that can be accessed by a native application edition. In another example, a tag may indicate that the record 340 corresponds to a news article or any other suitable category.

The query analysis module 312 receives a query wrapper 100 containing a search query 102, search indicia 106, and in some implementations, context parameters 104 (e.g., geolocation of a user device 200, an operating system type of the user device 200, or a data structure indicating the native applications stored on the user device). When the query analysis module 312 receives a search query 102, the query analysis module 312 analyzes the query terms of the search query 102 and/or the context parameters. For example, the query analysis module 312 may perform various analysis operations on the query terms of the received search query 102. Example analysis operations may include, but are not limited to, tokenization of the search query 102, filtering of the search query 102, stemming the query terms of the search query 102, synonymization of the search terms, and stop word removal. In some implementations, the query analysis module 312 outputs tokens representing the search query 102.

The set generation module 314 identifies a consideration set of function IDs based on the tokens provided by the query analysis module 312. As used herein, the term consideration set of function IDs can refer to a list of function IDs 342. In some scenarios, the function IDs 342 respectively indicate records 340 that match (at least to some degree) to the search query 102. In some examples, the set generation module 314 may identify records 340 based on matches between the tokens and terms contained in the records 340. For example, the set generation module 314 may identify the records 340 based on matches between tokens generated by the query analysis module 312 and terms included in the application state information 344 (which may also be tokenized). The set generation module 314 may further determine an initial score for each identified record (and not the result score of the record). In some implementations, the set generation module 314 may utilize the Apache Lucene libraries supported by the Apache Software Foundation to identify the consideration set and obtain the initial scores thereof. The records 340 may be indexed in one or more search indexes. The search indexes may be inverted indexes that associate keywords and combinations of keywords to the records 340 in which the keywords and combinations of keywords appear.

In some implementations, the set generation module 314 filters the consideration set based on the search function indicated by the search indicia 106 in the query wrapper 100. As previously indicated, the application state information 344 may include metadata tags that are associated with the record 340. The set generation module 314 may filter out any records 340 that do not include a tag that corresponds to the search function. For instance, if the search function is "web results only," the set generation module 314 may filter out any records 340 that do not correspond to a web application. In another example, if the search function indicates "news," the set generation module 314 may filter out any records 340 that do not include a tag indicating that the corresponding state is a news article. In this way, the remaining records 340 correspond to the search indicia 106 included in the query wrapper 100.

In some implementations, the results processing module 316 scores the function IDs 342 indicated by the filtered consideration set and generates the search results 120 based on the scored function IDs 342. The scores associated with the function IDs 342 may be referred to as "result scores." The results processing module 316 may determine a result score for each of the function IDs 342 identified the consideration set. The result scores associated with a function ID 342 may indicate the relative rank of relevance of a corresponding record 340 with respect to the other records 340. For example, a larger result score may indicate that a record 340 is more relevant to the search query 102. The information conveyed by the search results 120 may depend on how the result scores are calculated by the results processing module 316. For example, the result scores may indicate the relevance of an application state to the search query 102, the popularity of an application state, and/or other properties of the application state, depending on what attributes the results processing module 316 uses to score the function IDs 342.

The results processing module 316 may determine result scores for function IDs 342 in any suitable manner. In some implementations, the results processing module 316 determines a result score of a function ID 342 based on one or more scoring features. The scoring features may be associated with the record 340 of the function ID 342 and/or the search query 102.

A record scoring feature may be based on any data associated with a record 340. For example, record scoring features may be based on any data included in the application state information 344 of the record 340. Example record scoring features may be based on metrics associated with a person, place, or thing described in the record 340. Example metrics may include the popularity of a place described in the record and/or ratings (e.g., user ratings) of the place described in the record 340. In one example, if the record 340 describes a song, a metric may be based on the popularity of the song described in the record 340 and/or ratings (e.g., user ratings) of the song described in the record 340. The record scoring features may also be based on measurements associated with the record 340, such as how often the record 340 is retrieved during a search and how often access mechanisms linking to the state represented by the record 340 are selected by a user when appearing in the search results 120. Record scoring features may also be based on whether the record 340 describes a default state or a deeper application state.

A query scoring feature may include any data associated with the search query 102. For example, query scoring features may include, but are not limited to, a number of words in the search query 102, the popularity of the search query 102 (e.g., how often the search query 102 is received by the search system 300 or the total number of times the search query 102 has been received by the search system 300) and the expected frequency of the words in the search query 102. A record-query scoring feature may include any data generated based on data associated with both the record 340 and the search query 102 that resulted in identification of the record 340 by the set generation module 314. For example, record-query scoring features may include, but are not limited to, parameters that indicate how well the terms of the search query 102 match the terms of the application state information of the identified record 340 (e.g., the initial score assigned to the record by the set generation module 314).

The results processing module 316 may generate a result score of a function ID 342 based on at least one of the record scoring features, the query scoring features, and the record-query scoring features. The results processing module 316 may determine a result score based on one or more of the scoring features listed herein and/or additional scoring features not explicitly listed. In some examples, the results processing module 316 may include one or more machine learned models (e.g., a supervised learning model) configured to receive one or more scoring features. The one or more machine learned models may generate result scores based on at least one of the record scoring features, the query scoring features, and the record-query scoring features. For example, the results processing module 316 may pair the search query 102 with each function ID 342 and calculate a vector of features for each (query, record) pair. The vector of features may include one or more record scoring features, one or more query scoring features, and one or more record-query scoring features. The results processing module 316 may then input the vector of features into a machine-learned regression model to calculate a result score of the function ID 342. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The results processing module 316 associates each calculated result score with the function ID 342 of the record 340 to which the calculated score corresponds. The results processing module 316 may then rank the function IDs 342 based on the result scores thereof. The results processing module 316 may then generate the search results 120 based on the ranked function IDs 342. For each function ID 342, the results processing module 316 may generate a result object based on the record 340 of the function ID 342. The results processing module 316 may include the access mechanism, as well as any relevant state information 344 in the result object. The results processing module 316 may encode the result objects in a container, such as a .JSON file or an XML file, to obtain the search results 120. The results processing module 316 may transmit the container to the user device 200.

In the example provided above, the search system 300 utilizes the search indicia 106 to filter records 340 in a consideration set. The search system 300 may utilize the search indicia 106 in any other suitable manner. For instance, the search indicia 106 may be used to select the search indexes to search using the query wrapper 106. Additionally or alternatively, the search indicia 106 may be used to determine the type of search to perform or a search subsystem to which the query wrapper 100 should be routed.

Figure 4:
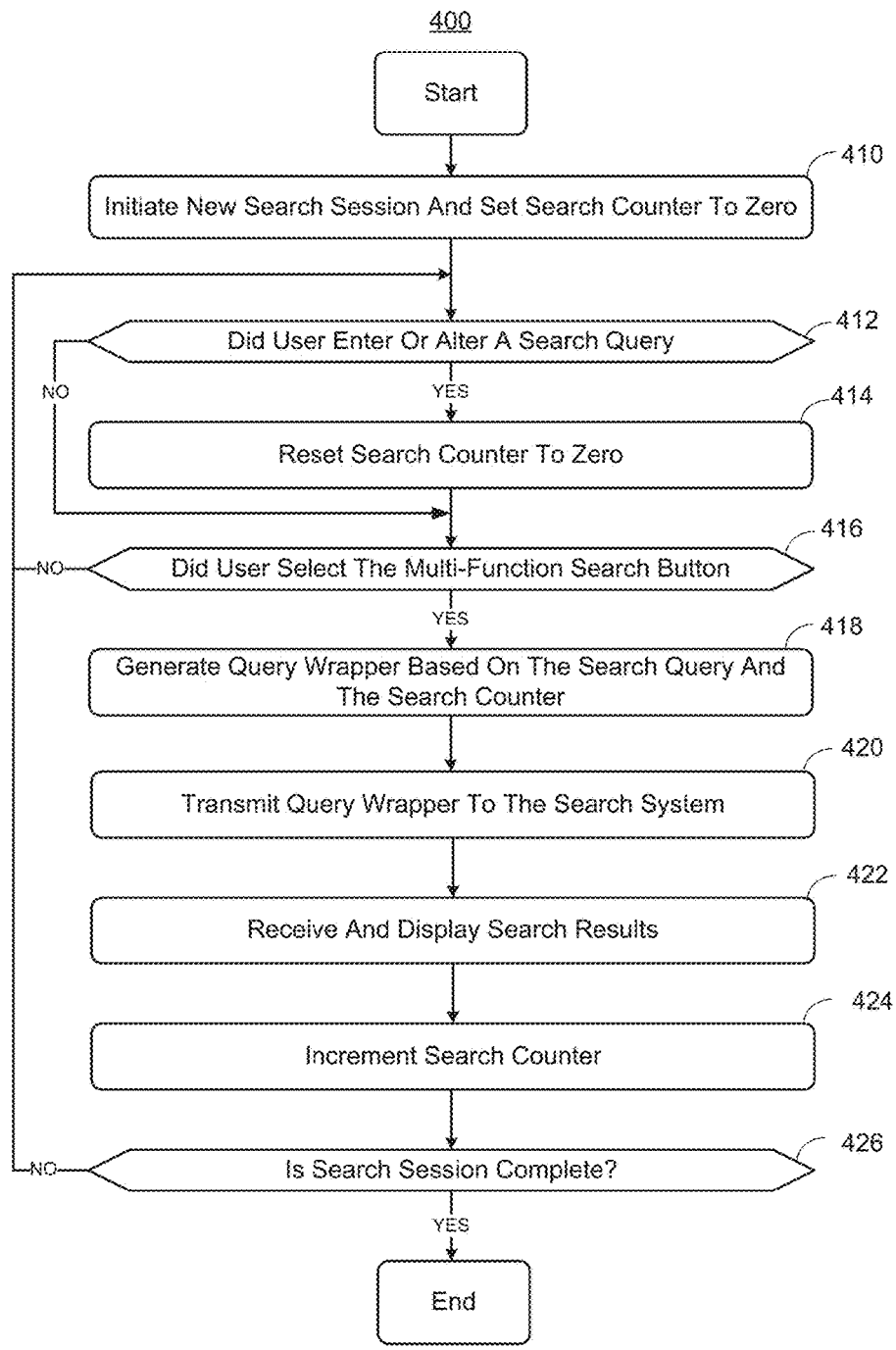
FIG. 4 is a flow chart illustrating an example set of operations of a method for performing a search using a multi-function search button.

Referring now to FIG. 4, a set of operations of a method 400 for performing a search using a multi-function search button is disclosed. The method 400 is discussed with respect to the user device 200 of FIG. 2. The method 400 may be performed by any suitable user device 200.

At 410, the GUI module 219 initiates a new search session and sets a search counter to zero. The GUI module 219 may initiate a new search session upon the user opening the search application 212, entering a search query 102 into the search bar 112 displayed in the launch screen of the user device 200, or accessing a web application edition of the search application via the web browser 216. Upon initiating a new search session, the GUI module 219 resets the search counter to zero.

At 412, the GUI module 219 determines whether the user entered a new search query 102. If so, the GUI module 219 resets the search counter, as shown at 414. If the user has not entered a new search query 102, the GUI module 219 determines whether the user has selected the multi-function search button 114, as shown at 416. If not, the GUI module 219 continues to wait for the user to enter a new search query 102 or select the multi-function search button 114.

If the user has selected the multi-function search button 114 at 416, the GUI module 219 generates a query wrapper 100 based on the search query 102 and the value of the search counter, as shown at 418. The GUI module 219 inserts the search query 102 and a search indicia 106 in the query wrapper 100. The search indicia 106 is based on the value of the search counter. In some implementations, the GUI module 219 inserts the value of the search counter as the search indicia. In other implementations, the GUI module 219 determines a search function identifier based on the search counter. For instance, the GUI module 219 may query a look-up table using the value of the search counter. The look-up table returns the search function identifier. The GUI module 219 inserts the search function identifier in the query wrapper 100 as the search indicia 106. In some implementations, the GUI module 219 further includes one or more context parameters 104 (e.g., location, profile ID, a list of installed native applications, etc.) in the query wrapper 100.

At 420, the GUI module 219 transmits the query wrapper 100 to the search system 300. At 422, the GUI module 219 receives the search results 120 that are responsive to the search query 102 and search indicia 106. The GUI module 219 outputs the search results in the GUI 110. At 424, the GUI module 219 increments the search counter. At 426, the GUI module 219 determines whether the search session is complete. For example, if the user selects a search result 120 from the search results, the GUI module 219 can initiate accessing the state indicated by the selected search result 120. The GUI module 219 can then end the search session. Otherwise, the GUI module 219 can continue to monitor the GUI 110 to determine whether a new search query 102 is entered and/or the user selects the multi-function search button 114.

The method 400 is described with respect to a search GUI module 219. It is noted that the method, or any portion thereof, may be executed by any suitable component of the user device, and not necessarily the search GUI module 219.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device," and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, and a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    displaying, by a processing device of a mobile user device, a graphical user interface including a search box, a search button and different search functions, the search box receiving user input indicative of a search query and the search button receiving user input indicating a command to execute a search;
    receiving, by the processing device, the search query in the search box via a user interface of the mobile user device;
    if a selection for the search button is received, displaying, by the processing device, first search results corresponding to a first search function from among the different search functions, wherein the first search results is received from a search server in response to a first query wrapper containing the search query and the first search function; and
    if the selection for the same search button is received, displaying, by the processing device, second search results in place of the first search results, second search results the corresponding to a second search function from among the different search functions, wherein the second search results is received from the search server in response to a second query wrapper containing the search query and the second search function;
    wherein different search results are displayed according to the number of selection for the same search button.

2. The method of claim 1, wherein the first search function is a first search function identifier and the second search function is a second search function identifier.

3. The method of claim 1, wherein the first search function indicates that a user selected the search button one time in relation to the search query and the second search function indicates that a user selected the search button two times in relation to the search query.

4. The method of claim 1, further comprising:
    displaying, by the processing device, a first image in the search button; and
    in response to displaying the first search results, displaying a second image in the search button in place of the first image, the second image being indicative of the second search function.

5. The method of claim 1, further comprising:
receiving, by the processing device, a third selection of the search button;
in response to the third selection, generating, by the processing device, a third query wrapper containing the search query and third search function;
transmitting, by the processing device, the third query wrapper to the search system;
receiving, by the processing device, third search results from the search system in response to the third query wrapper; and
displaying, by the processing device, the third search results in the graphical user interface in place of the second search results.

6. The method of claim 5, wherein an ordering of the first search function, the second search function, and third search function is a default order.

7. The method of claim 5, wherein an ordering of the first search function, the second search function, and third search function is selected by a user.

8. A non-transitory computer-readable medium storing a plurality of computer-executable instructions, the instructions, when executed by a processing device of a mobile user device, cause the processing device to:
display a graphical user interface including a search box, a search button and different search functions, the search box receiving user input indicative of a search query and the search button receiving user input indicating a command to execute a search;
receive the search query in the search box via a user interface of the mobile user device;
if a selection for the search button is received, display first search results corresponding to a first search function from among the different search functions, wherein the first search results is received from a search server in response to a first query wrapper containing the search query and the first search function; and
if the selection for the same search button is received, display second search results in place of the first search results, second search results the corresponding to a second search function from among the different search functions, wherein the second search results is received from the search server in response to a second query wrapper containing the search query and the second search function;
wherein different search results are displayed according to the number of selection for the same search button.

9. The computer-readable medium of claim 8, wherein the first search function is a first search function identifier and the second search function is a second search function identifier.

10. The computer-readable medium of claim 8, wherein the first search function indicates that a user selected the search button one time in relation to the search query and the second search function indicates that a user selected the search button two times in relation to the search query.

11. The computer-readable medium of claim 8, wherein the computer readable instructions further cause the processing device to:
display a first image in the search button; and
display a second image in the search button in place of the first image in response to displaying the first search results, the second image being indicative of the second search function.

12. The computer-readable medium of claim 8, wherein the computer readable instructions further cause the processing device to:
receive a third selection of the search button;
generate a third query wrapper containing the search query and third search indicia in response to the third selection, the third search function being indicative of a third search function;
transmit the third query wrapper to the search system;
receive third search results from the search system in response to the third query wrapper; and
display the third search results in the graphical user interface in place of the second search results.

13. The computer-readable medium of claim 12, wherein an ordering of the first search function, the second search function, and third search function is a default order.

14. The computer-readable medium of claim 12, wherein an ordering of the first search function, the second search function, and third search function is selected by a user.

* * * * *